United States Patent
Gregory

[11] 3,835,726
[45] Sept. 17, 1974

[54] LAWN MOWER CONTROL
[75] Inventor: Ted Gregory, Mundelein, Ill.
[73] Assignee: Arens Controls, Inc., Evanston, Ill.
[22] Filed: Jan. 12, 1973
[21] Appl. No.: 323,286

[52] U.S. Cl.............................. 74/501 P, 74/501 R
[51] Int. Cl. ............................................. F16c 1/10
[58] Field of Search ...... 74/491, 501 P, 501 R, 502, 74/527

[56] References Cited
UNITED STATES PATENTS

| | | | |
|---|---|---|---|
| 2,056,549 | 10/1936 | Weinberg | 74/502 X |
| 2,826,093 | 3/1958 | Draper | 74/527 |
| 3,082,642 | 3/1963 | Hammerand | 74/501 P |
| 3,115,225 | 12/1963 | Fraylick et al. | 74/501 P |
| 3,479,903 | 11/1969 | Hermanson et al. | 74/502 |

Primary Examiner—Samuel Scott
Assistant Examiner—Frank H. McKenzie, Jr.
Attorney, Agent, or Firm—Olson, Trexler, Wolters, Bushnell & Fosse, Ltd.

[57] ABSTRACT

A Bowden cable control for lawn mower engines and the like is provided. The control includes a control plate and a control knob; a retaining flange is integrally formed with the knob to engage the underside of the plate. Embossments formed at the ends of the knob stress the knob to provide a resilient slide control action throughout a wide range of environmental conditions.

3 Claims, 11 Drawing Figures

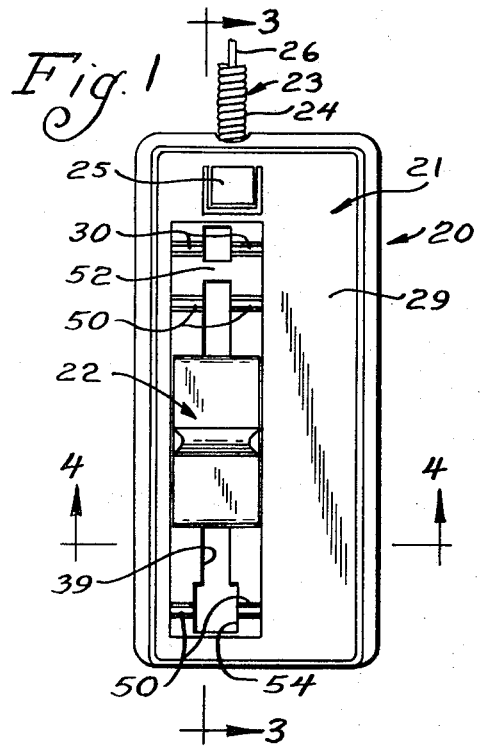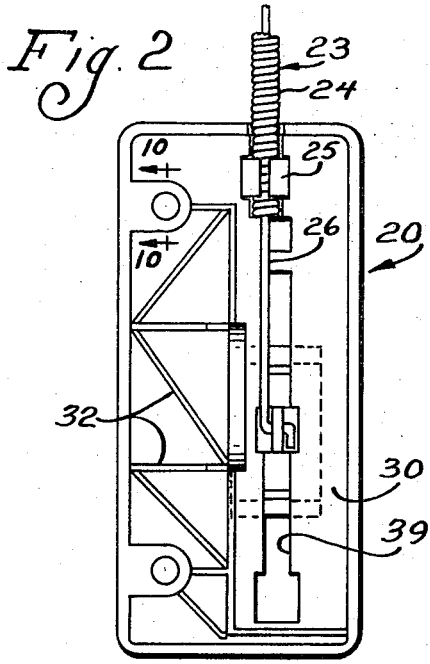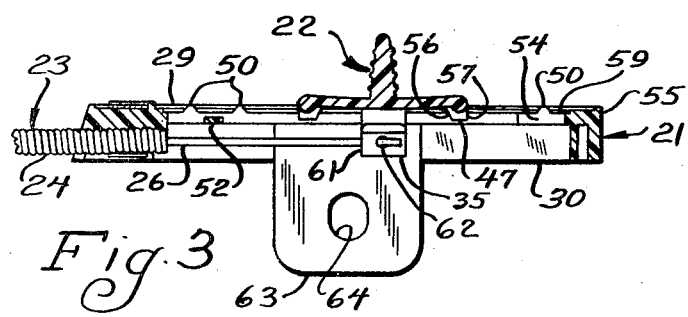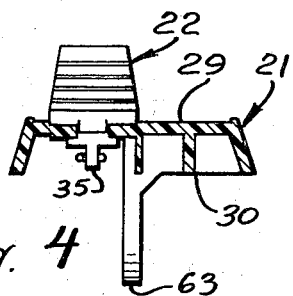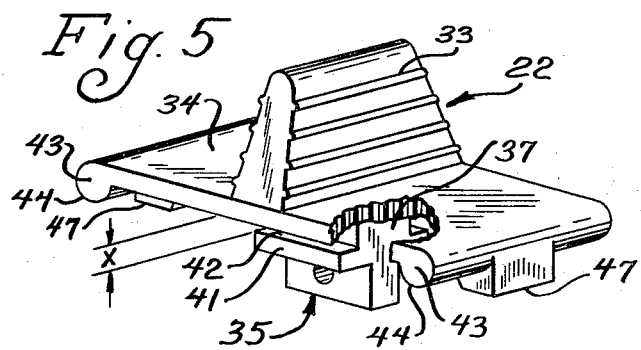

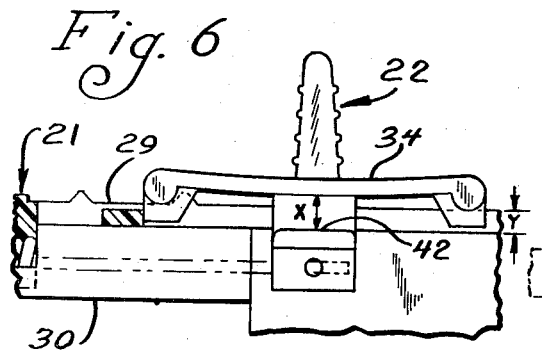
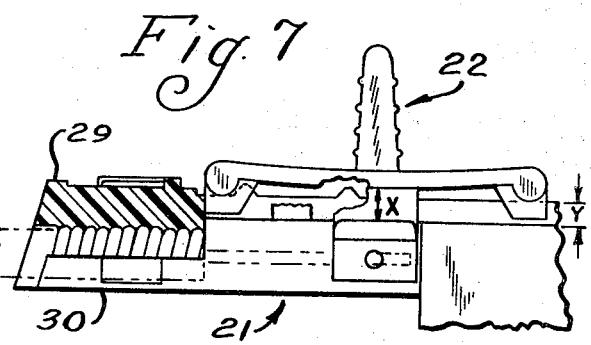
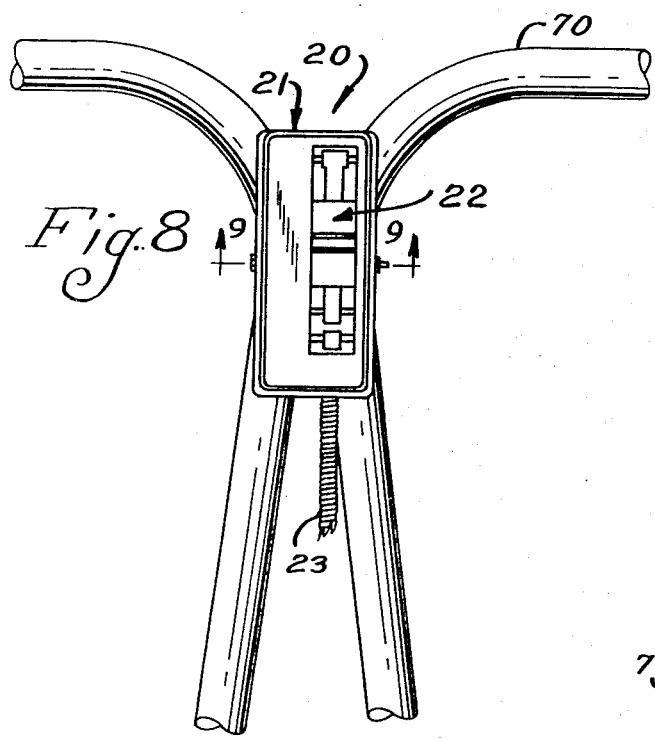
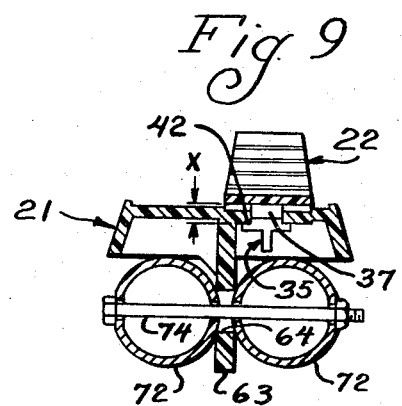
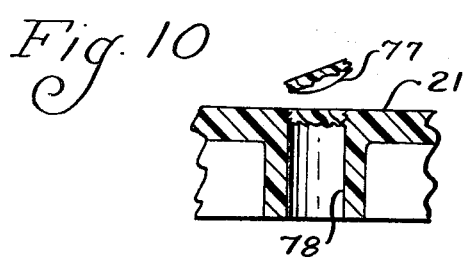
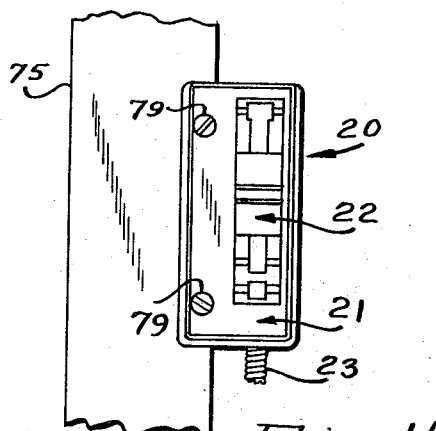

LAWN MOWER CONTROL

BACKGROUND OF THE INVENTION

This invention relates generally to control devices and more particularly concerns a control for operating a Bowden cable used with a lawn mower or like device.

Modern power lawn mowers usually include a gasoline engine mounted on a wheeled chassis, a guiding handle pivotally connected to the chassis, and one or more control mechanisms extending from the upper portions of the guiding handle to the engine and other parts. These control mechanisms often include a Bowden cable having a flexible wire coil or other outer covering within which is slidably carried an inner control wire. One end of the control wire is connected to a carburetor butterfly valve lever, fuel valve, or other controllable assembly, while the other end of the control wire is connected to an engine control device mounted on the guiding handle for easy manipulation by the operator. By adjusting this control, the engine speed or power can be varied through a given range.

In designing such engine controls, several difficult design criteria must be considered. The expense of these engine controls must be kept to a minimum, but the controls must be rugged, virtually maintenance-free and durable. The controls must be capable of being securely mounted to the controlled device and must provide a solid, positive operating feel to the operator, yet they must be capable of precise adjustment. Easy operation and precise adjustment must be available to the control operator, yet the control must withstand a wide range of temperatures, and must be minimally affected by dirt, petroleum products and like liquids, vibration, and occasionally relatively severe impact shocks. Producton economies can be realized if one control can be adapted for use with several disparate types of lawn mowers, yet the appearance of the control should suggest that it has been carefully matched to the controlled device.

It is the general object of the present invention to meet, to as great an extent as possible, the above general design criteria.

More specifically, it is an object of the present invention to provide a control mechanism for lawn mowers and like devices which includes a minimum number of parts, and which can thus be manufactured at relatively low cost.

A related and still more specific object is to provide a control for lawn mowers and the like devices wherein the slidable control knob of the device not only functions as a cable actuator, but also retains itself on its control plate, thereby eliminating previously necessary control knob retainer springs and, in turn, reducing assembly labor time and cost.

It is a similar object to provide a control device for lawn mowers and like devices wherein the control knob resiliently retains itself upon its control plate, and the resilient knob retaining action is not lost even though the control knob becomes worn from use, or is subjected to a relatively wide range of temperature and environmental conditions.

It is another object of the invention to provide a control mechanism which can be used with any one of a variety of lawn mowers or like Bowden cable-controlled devices and a variety of handle bar or other mounting site configurations.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a plan view showing a typical control device embodying the present invention;

FIG. 2 is a plan view showing the underside of the control device illustrated in FIG. 1;

FIG. 3 is a sectional view taken substantially in the plane of line 3—3 in FIG. 1 and showing in further detail the parts of the control mechanism;

FIG. 4 is a sectional view taken substantially in the plane of line 4—4 in FIG. 1 and showing in yet further detail the parts of the control mechanism;

FIG. 5 is a perspective view showing in still further detail the control knob of the present invention;

FIG. 6 is a fragmentary sectional view taken substantially in the plane of line 3—3 in FIG. 1 and showing in yet further detail the control knob and associated control plate of the present invention, the control knob being positioned at the end point of travel in one of the alternate configurations of the invention;

FIG. 7 is a sectional view similar to FIG. 6 and showing the control knob at the end point of travel of an alternate configuration of the invention;

FIG. 8 is a general plan view showing the illustrated embodiment of the invention as it appears when installed upon a lawn mower handle or like supporting structure;

FIG. 9 is a sectional view taken substantially in the plane of line 9—9 in FIG. 8 and showing a typical arrangement by which the invention may be mounted upon an alternate supporting structure;

FIG. 10 is a fragmentary sectional view taken substantially in the plane of line 10—10 in FIG. 2 showing a portion of the control plate which may be adapted for mounting the control device upon a supporting structure; and FIG. 11 is a plan view similar to FIG. 8 but showing the control device mounted upon an associated structure by the alternate method.

DESCRIPTION OF THE PREFERRED EMBODIMENTS

While the invention will be described in connection with preferred embodiments, it will be understood that it is not intended to limit the invention to those embodiments. On the contrary, it is intended to cover all alternatives, modifications and equivalents as may be included within the spirit and scope of the invention.

Turning first to FIG. 1, there is shown a typical control device 20 embodying the present invention. In general, the control device 20 includes a control plate 21 upon which is slidably mounted a control knob 22 for adjusting the performance of a device such as lawn mower engine (not shown) by means of a Bowden cable 23. It will be understood that a variety of engines and indeed, other mechanisms can be controlled by the described control 20 and Bowden cable 23 without departing from the spirit and scope of the invention. However, for illustrative purposes, the invention will be described in connection with its use in controlling the speed of a known lawn mower engine.

The Bowden cable device 23 connected to the lawn mower engine includes an outer member 24 which, as illustrated, here takes the form of a closely wound wire coil secured, by a clip 25 or other convenient means, to the control plate 21. Carried for sliding motion within the outer member 24 is an inner control wire 26 operatively connected to the carburetor or other mechanism of the lawn motor engine (not shown). It will be understood that the invention can be used not only with the described Bowden cable, but with any sheathed push-pull cable control device.

For purposes of the present discussion, the control plate 21 may be considered to have a top side 29 and an underside 30, although it will be understood that these terms are used in a relative sense only and are not to be regarded as requiring the control device to be mounted in a particular orientation. Appropriate bracing 32 is included, if desired, to stiffen the control plate 21.

The control knob 22 is provided with a finger tab 33, a base plate 34, and a foot 35 all integrally formed. In accordance with the invention, the control plate 21 is engaged by the knob 35 in a solid and precise manner, and to this end, the foot portion 35 includes a stem portion 37 substantially as wide the major portion of a knob guide slot 39 formed in the control plate 21. The plate 21 can be made to withstand a wide range of environmental conditions by forming it of acrylonitrile-butadiene styrene plastic. The knob can be made of an acetal resinplastic such as that marketed, for example, by E. I. DuPont De Nemours & Company under the trade name "Delrin."

To retain the control knob 22 upon the control plate 21, a flange portion 41 wider than the stem portion 37 engages the underside 30 of the control plate 21 adjacent the slot 39. As illustrated in FIGS. 5, 6, 7 and 9, the free distance X between the bottom of the base plate 34 and the top 42 of the flange portion 41 substantially equals the thickness of the control plate 21 adjacent the slot 39, thereby providing a solid mounting and precise feel for the control knob 22.

In accordance with another aspect of the invention, the control knob 22 is mounted upon the control plate 21 to provide a positive control action. To this end, embossments 43 are provided at the extremities of the control knob base plate 34 for engaging the top side 29 of the control plate 21 at a distance from the stem portion 37 of the foot 35. As can be envisioned by reference to FIGS. 6 and 7, the free distance Y between the bottom 44 of the embossments 43 and the top 42 of the flange portion 41 is less than the thickness of the control plate 21 adjacent the slot 39 before the control knob 22 is assembled upon the plate 21. Thus, when the knob 22 is assembled upon the plate 21, a slightly bowed configuration is imparted to the knob base plate 34, thereby placing resilient bending stress in the knob base plate 34 and providing the desired control feel and action. To further enhance the positive control feel of the control device, enlarged guide lugs 47 can be provided at each embossment 43 to engage the control plate 39 and encourage smooth translational motion of the knob 22 across the plate 21.

In accordance with another aspect of the invention, it is important that the control operator be able to readily find, even by feel, certain control operation configurations. For example, the value of the control is enhanced if the operator is able to find, by touch as well as by sight, that control knob position necessary to stop the controlled engine, or the knob position necessary for choking the engine. In the device illustrated, therefore, the control plate 21 is provided with stop ridges 50 on the top side 29 of the control plate 21 for engagement by the control knob embossments 43 as the control knob travels across the control plate. Thus, the action of the control knob can be easily felt as the embossments 43 contact the stop ridges 50, and the position of the control knob 22 relative to the stop ridges 50 can also be easily ascertained at a glance by the operator.

The value of the control is further enhanced by configuring the control for use with a variety of mower engines. To this end, a stop bar 52 is formed across the slide slot 39 for engaging the control knob 22 and restricting its travel to less than the full length of the slot 39 when the control is used with one such engine. If it is desired to use the control with another engine requiring extended control knob travel, the stop bar 52 can be easily removed by a blow or other means during control assembly, thus permitting the control knob 22 to travel the full length of the control knob slot 39.

In accordance with yet another aspect of the invention, assembly of the control device is relatively easy and inexpensive, and the device may be easily and inexpensively attached, in turn, to the handle of the mower or other structure. In assembling the control device itself, the stem 35 of the control knob 22 is simply inserted through a keyhole 54 larger than the flange portion 41 which must pass therethrough, and the knob 22 is then pushed along the plate slot 39. After the foot 35 of the control knob 22 has been inserted into the keyhole slot 54 the embossment 43 and guide lug 47 can be urged over the end 55 of the control plate 21. This relative motion is facilitated by a cam surface 56 formed upon the inner side of the embossment 47. Conversely, accidental removal of the now-assembled control knob 22 from the control plate 21 is discouraged, since the outside or opposite end of the embossment 47 is provided with an abutting surface 57 which provides no camming action upon its engagement with the end 59 of the guide slot 39.

After assembly of the control 22 upon the control plate 21, the movable wire 26 of the Bowden cable 23 can be attached to a projecting lug 61 by threading it through a receiving eyelet 62 or by other convenient means. After securing the outer wire housing member 24 to the control plate 21 by the appropriate clamp 25 or other means, the cable 23 and control 20 is ready to be attached to the handle 70 of a lawn mower or other structure. It is a feature of the invention that this attachment can be accomplished in several ways to permit use of the device with most popular lawn mowers and other devices. For example, a mounting stud 63 having a bolt hole 64 can be provided. The control 20 can be mounted upon the lawn mower handle 70 by inserting the mounting stud 63 between the bars 71 and 72 of the handle 70 and then securing the control 20 to the handle 70 by passing a bolt or other fastener 74 through the handle bars 72 and stud 64, as illustrated in FIG. 9. To permit the control 20 to be mounted on handle bars 71 and 72 of various diameters, the enclosed bolt hole 64 is elongated, thereby permitting the fastener 74 to be inserted through a range of positions. Alternatively, the control 20 can be attached to a handle comprising a single bar in a similar manner, as can be easily envisioned.

The control 20 can also be attached to a wooden lawn mower handle or other structure 75 as illustrated in FIG. 11. To attach the control 20 in this manner, small plugs 77 can be removed from the control plate 21 at the top of preformed bolt holes 78 as illustrated in FIG. 10, and mounting screws 79 inserted therethrough. Use of these holes 78 and screws 79 permits the control 20 to be attached either above the structure 75 as illustrated, or below it, as can be envisioned.

The invention is claimed as follows:

1. In a slide control for operating a Bowden cable and the like, said control including a control plate having a top side, an underside, and a slot formed therein, the improvement comprising a control knob having a finger tab, a base plate, and a foot integrally formed with the base plate, the foot including a stem portion substantially as wide as the major portion of the control plate slot and a flange portion wider than the stem portion for engaging the underside of the control plate adjacent the slot, the free distance between the bottom of the base plate and the top of the flange portion substantially equaling the thickness of the control plate adjacent the slot, the control knob further including an embossment at each end of said base plate for engaging the top side of the control plate at a distance from the stem portion of the foot, the free distance between the bottom of the embossment and the top of the flange portion being less than the thickness of the control plate adjacent the slot for placing resilient bending stress in the control knob base plate when the control knob engages the control plate, each embossment including an enlarged guide lug for engaging the control plate slot to encourage smooth translational motion of the control knob across the plate.

2. In a slide control for operating a Bowden cable and the like, said control including a control plate having a top side, and underside, and a slot formed therein, the improvement comprising a control knob having a finger tab, a base plate, and a foot integrally formed with the base plate, the foot including a stem portion substantially as wide as the major portion of the control plate slot and a flange portion wider than the stem portion for engaging the underside of the control plate adjacent the slot, the free distance between the bottom of the base plate and the top of the flange portion substantially equaling the thickness of the control plate adjacent the slot, the control knob further including an embossment at each end of said base plate for engaging the top side of the control plate at a distance from the stem portion of the foot, the free distance between the bottom of the embossment and the top of the flange portion being less than the thickness of the control plate adjacent the slot for placing resilient bending stress in the control knob base plate when the control knob engages the control plate, said embossment being provided with a cam surface at its inner side to encourage passage of the embossment and guide lug over the end of the control plate during assembly of the control plate and control knob, said embossment being further provided with an abutment surface at its outer side to discourage passage of the embossment and guide lug over the end of the control plate slot during operation of the slide control.

3. A slide control for operating a Bowden cable and the like, said control including a control plate having a top side, an underside, and a slot formed therein, a control knob having a finger tab, a base plate, and a foot integrally formed with the base plate, the foot including a stem portion substantially as wide as the major portion of the control plate slot and a flange portion wider than the stem portion for engaging the underside of the control plate adjacent the slot, the free distance between the bottom of the base plate and the top of the flange portion substantially equaling the thickness of the control plate adjacent the slot, and the control plate including a stop bar positioned across the slot for engaging the control knob and restricting its travel to less than the full length of said slot.

* * * * *